(12) United States Patent
Spindler et al.

(10) Patent No.: US 8,676,507 B2
(45) Date of Patent: Mar. 18, 2014

(54) VEHICLE NAVIGATION SYSTEM

(75) Inventors: Carsten-Christian Spindler, Karlsruhe (DE); Juergen Welscher, Markt Schwaben (DE); Martin Fischer, Munich (DE); Simon Schuetz, Stuttgart (DE); Vladimir Ivanov, Munich (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 13/407,096

(22) Filed: Feb. 28, 2012

(65) Prior Publication Data

US 2012/0253671 A1    Oct. 4, 2012

(30) Foreign Application Priority Data

Mar. 1, 2011   (EP) ..................................... 11156376

(51) Int. Cl.
 *G08G 1/09* (2006.01)
(52) U.S. Cl.
 USPC ......................................... 701/532; 701/400
(58) Field of Classification Search
 USPC ................ 701/23–26, 28, 400, 408–411, 532
 See application file for complete search history.

(56) References Cited

U.S. PATENT DOCUMENTS

| | | | | |
|---|---|---|---|---|
| 4,677,450 A | * | 6/1987 | Ito et al. ......................... | 701/455 |
| 4,954,959 A | * | 9/1990 | Moroto et al. ................ | 701/437 |
| 5,168,452 A | * | 12/1992 | Yamada et al. ............... | 701/533 |
| 5,982,301 A | | 11/1999 | Ohta et al. | |
| 2008/0120028 A1 | | 5/2008 | Schmitz | |
| 2009/0024318 A1 | | 1/2009 | Sakai | |

OTHER PUBLICATIONS

Extended European Search Report dated Aug. 4, 2011.

* cited by examiner

*Primary Examiner* — Yonel Beaulieu
(74) *Attorney, Agent, or Firm* — Patterson & Sheridan, LLP

(57) ABSTRACT

A vehicle navigation system includes a map database storing map data. The map data has links representing road segments, road number icons, and additional road information icons. At least one of the links is associated with at least one of the road number icons and at least one of the additional road information icons. The vehicle navigation system may furthermore include a processing unit coupled to the map database and configured to control outputting of route guidance information via an output device. The outputting of route guidance information may include displaying a road number icon and an additional road information icon together with a link if the link is associated with the road number icon and the additional road information icon.

16 Claims, 4 Drawing Sheets

VEHICLE NAVIGATION SYSTEM

PRIORITY CLAIM

This application claims the benefit of priority from European Patent Application EP 11 156 376.3, filed Mar. 1, 2011, which is incorporated by reference.

BACKGROUND OF THE INVENTION

1. Technical Field

The invention relates to a vehicle navigation system having a map database storing map data, a method of generating a map database, and a method of processing data stored in a map database. The invention relates in particular to such systems and methods in which a map database may include attributes.

2. Related Art

Navigation systems are known which determine a route from a starting point to a destination using map data. Generally, these navigation systems may perform a search for a route which minimizes a cost function. The cost function may represent travel time, distance or fuel costs associated with the route, or any other suitable quantity to be minimized. The route which is optimum may depend on the activation of prefer or avoid options. Prefer and avoid options for highways, ferries or tunnels may be provided.

In addition to route determination, navigation systems may also provide route guidance functions via a user interface. The provision of guidance information may involve the generation of video or audio output which provides information on a portion of a road network surrounding the vehicle, possibly combined with video or audio directions to a driver.

SUMMARY

According to one example, a vehicle navigation system includes a map database storing map data. The map data has links representing road segments, road number icons, and additional road information icons. At least one of the links is associated with at least one of the road number icons and at least one of the additional road information icons. The vehicle navigation system may furthermore include a processing unit coupled to the map database and configured to control outputting of route guidance information via an output device. The outputting of route guidance information may include displaying a road number icon and an additional road information icon together with a link if the link is associated with the road number icon and the additional road information icon.

Another example relates to a method, including the steps of identifying links to be displayed on a display of a navigation system, retrieving road number icons and additional road information icons associated with at least some of the links from a map database, and displaying the links with the retrieved road number icons and the additional road information icons.

The map database of the vehicle navigation system may also include a data structure, the data structure having a data entry for each link being associated with a road number, the data entry having a reference to a road number and to an additional information icon. Furthermore, the map database may include a metadata data structure having road number icons and additional road information icons. The metadata structure may have metadata entries for different types of roads, each metadata entry having road number icons and additional road information icons for the respective type of road. The metadata structure may further include several sub-data structures for different regions.

The additional road information icons may identify different roads having the same road number. The additional road information icons may be selected from the group including icons indicating a direction, an alternate route, a bypass, a business route, a city route, a connector route, a link road, a loop, a spur route, a toll route, a scenic route, a route suitable for trucks, and a temporary route.

With the above-defined example, routes bearing the same route number may be distinguished on a display of a navigation system using additional signs. Furthermore, the above-defined data structures and references between data structures allow for an effective handling of such additional road information icons. It is to be understood that the features mentioned above and those to be explained below can be used not only in the respective combinations indicated, but also in other combinations or in isolation.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
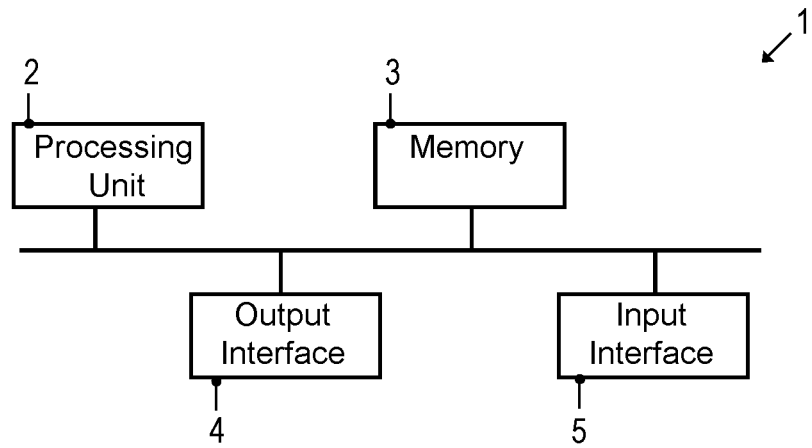
FIG. 1 is a schematic block diagram of an example navigation system.

FIG. 1 schematically illustrates a vehicle navigation system 1 according to an example. The navigation system 1 may include a processing unit 2 controlling the operation of the navigation system 1, e.g. according to control instructions stored in a memory. The processing unit 2 may include a central processing unit, for example in form of one or more microprocessors, digital signal processors or application-specific integrated circuits. The navigation system 1 may further include a map database stored in a memory 3. The memory 3 may include any one, or any combination, of various types of memory, such as random access memory, flash memory or a hard drive, but also removable memories such as a compact disk ("CD"), a DVD, a memory card or the like. The navigation system 1 also includes an output interface 4 for outputting guidance information to a user. The output interface 4 may include an optical output device, an audio output device, or a combination thereof. The navigation system 1 also includes an input interface 5 which allows a user to set options. In particular, the input interface 5 may allow a user to set prefer or avoid options for route search.

The navigation system may include additional components, such as a position sensor and/or a wireless receiver and/or a vehicle interface. The position sensor may be adapted to determine the current position of the vehicle in which the navigation system 1 is installed. The position sensor may be a GPS ("Global Positioning System") sensor, a Galileo sensor, a position sensor based on mobile telecommunication networks and the like. The wireless receiver may be configured to receive information for updating the map database stored in the memory 3. The vehicle interface may allow the processing unit 2 to obtain information from other vehicle systems or vehicle status information via the vehicle interface. The vehicle interface may be CAN ("controller area network") or MOST ("Media Oriented Systems Transport") interfaces.

The memory 3 stores a map database including map data. The map database includes information on links representing road segments and attributes. The processor 2 may use the information stored in the map database for performing a route search when a user sets, via the input interface 5, a destination to be reached. The processor 2 may perform the route search independently of the second attributes assigned to lanes. The processor 2 may control the outputting of route guidance information.

The provision and use of a map database which allows data to be used efficiently for route search and route guidance may represent a considerable challenge. For example, for a route search, information on the fine scale structure of the road network is usually not required for locations remote from both the starting point and destination. However, information on at least certain types of roads, such as highways, at locations remote from both the starting point and destination will be required for a route search. By contrast, guidance functions may require information only in an area surrounding the vehicle, but to a greater level of detail.

Furthermore, in the map database, or in some implementations, various icons may be stored in a separate database. For example, road number icons which correspond to signs displayed at a road identifying a road by number. Items corresponding to certain roads in the map database may contain such road number icons or may point to such road number icons such that the road number icon may be displayed on a display screen of a navigation system when a map showing the corresponding road is displayed, thus facilitating identification of the road and recognizing the corresponding signs indicating the road.

However, in some countries, like the United States or Canada, a main road and branch roads from this main road or alternative roads to these main roads may bear the same road number. For example, in traffic signs along the road, sometimes additional signs are used together with the road number to identify the road more precisely.

Various attributes may be assigned to links and stored in the map database. The attributes may include information on starting and end points of links or other information related to map topology. Such attributes may be stored in a data structure having a pre-defined number of data fields which is respectively provided for each link or other map feature stored in the map database. In addition, attributes may be selectively assigned to links, or other features, only when present on the respective link.

The map database stored in the memory 3 may include different logical layers. Additionally, the map database may be split into different blocks which are associated with different update regions or tiles of a tiling. Such a structure facilitates performing updates. This is particularly desirable for performing updates of the map database to adjust the map database to local changes in a road network. Such updates may then be performed by updating only the update regions or tiles affected by changes in the road network. This allows the updates to be more readily performed in a more time-efficient manner or as over-the-air updates.

The map database or, in some examples, a database separate therefrom, may store various icons which are usable for graphic representation of a route on output interface 4 in case output interface 4 is an video output device like a display screen. The icons may include route number icons indicating a route number and additional road information icons which may be used in combination with road number icons to specify a specific branch of a route, for example in the USA or Canada, where the use of additional signs on roads is frequent (so called bannered routes). Information on links representing road segments and attributes in the map database may then refer to such additional road information icons and road number icons, as will be explained in further detail below.

Figure 2:
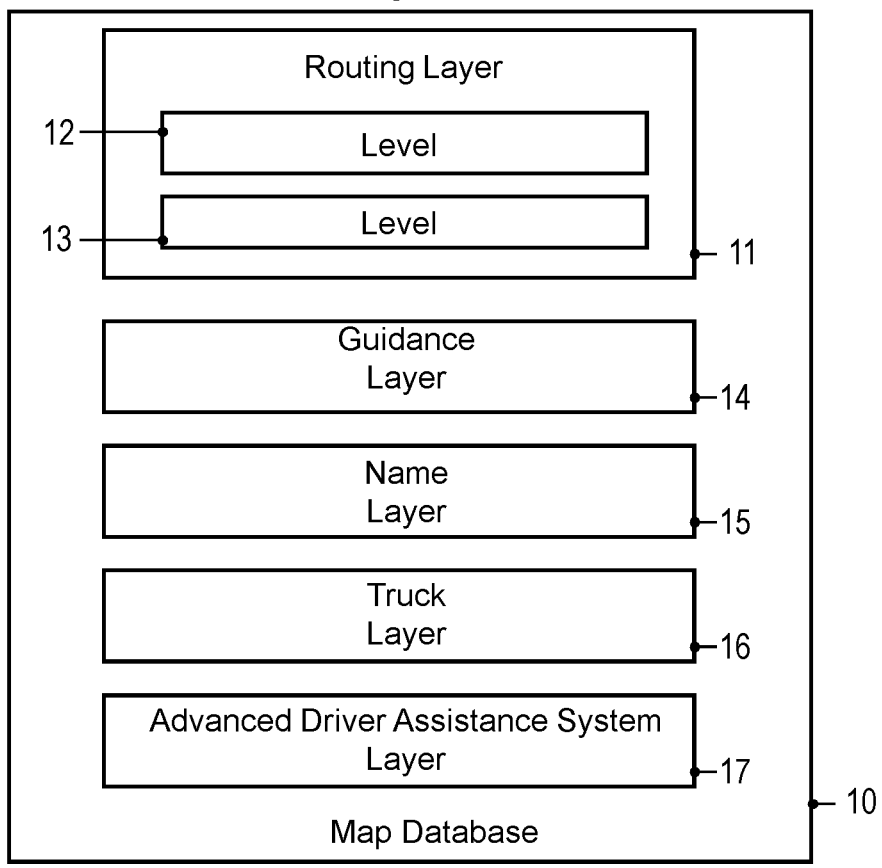
FIG. 2 is a schematic representation of an example map database.

FIG. 2 is a schematic representation of a map database 10 according to an embodiment. A map database 10 having the structure explained in the following may be stored in the memory 3 of the vehicle navigation system 1.

The map database 10 may include a plurality of layers 11 and 14 which include a routing layer 11 and a guidance layer 14. The routing layer 11 includes the information required for performing route searches. This information may include information on the topology of the road network, such as starting points and end points of links. The information in the routing layer 11 may further include costs associated with links for various cost models. The information in the routing layer 11 may further include attributes which allow the costs of links to be adjusted in a route search based on prefer or avoid options.

In the routing layer 11, there may be different levels 12, 13 which include data representing the road network to different levels of details. For illustration, while all road segments of the road network may be present at the level 13, some of the road segments may be omitted at a higher level 12.

The guidance layer 14 may include data required for route guidance. The guidance layer 14 may include data required for video and/or audio output of guidance information. For example, guidance 14 may include the above-mentioned road number icons and additional road information icons. The guidance layer may also include a level structure, with the data in the different levels representing the road network to different levels of details.

The routing layer 11 and the guidance layer 14 may be configured as separate tables stored in a memory. For example, the routing layer 11 may be a table in a SQL database, and the guidance layer 14 may be another table in the SQL database.

The map database 10 may include additional layers 15-17. A name layer 15 includes references to road names, house numbers or similar. A truck layer 16 may include specific attributes for trucks. An Advanced Driver Assistance System ("ADAS") layer 17 may include data for Advanced Driver Assistance. Additional or alternative layers may be provided, such as a layer for points of interest, a layer for phonetic representations, or a layer for basic map display. The map database 10 may have a structure as defined by the Navigation Data Standard ("NDS").

Figure 3:
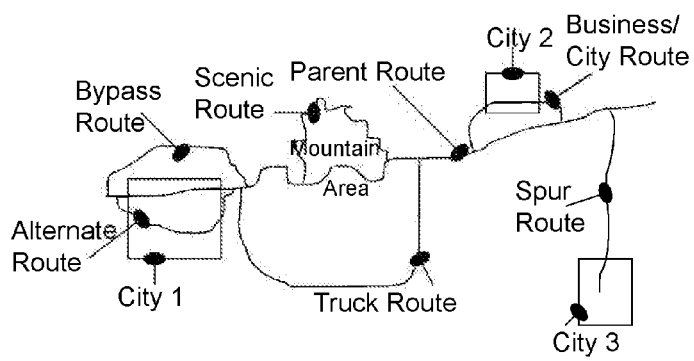
FIG. 3 is a schematic diagram showing examples of different types of routes.

In FIG. 3, a situation where additional road information icons may be used is depicted. In particular, in FIG. 3 a number of routes which may bear the same road number, namely a parent route, a business/city route, a truck route, an alternate route, a bypass route and a spur route as well as a scenic route are shown.

For example, the parent route may only bear the road number, whereas the other roads shown may bear the road number and be signed on the road with one or more additional road signs, which may be represented with road information icons on an output interface like output interface 4 of FIG. 1 of a navigation system. In such an example, the layout of the icons is not predefined. For example, on a map displayed on the navigation system the route number icon and one or more additional road information icons are vertically stacked, but for example on a list they may be placed in a row. Therefore, icons may be stored separately such that they can be freely combined with each other in any desired manner.

The following table shows, in the column "value", various designations for various additional road information icons, and in the column "description" the corresponding description for the respective value.

| Value | Description |
| --- | --- |
| NORTH<br>SOUTH<br>EAST<br>WEST | Divided routes are routes that have directional suffixes to indicate a split of the main route. (E.g. U.S. Route 25 splits into U.S. Route 25E (east) and U.S. Route 25W (west)) |
| ALT | An official alternate route is a special route that provides an alternate alignment for a highway. |
| BYPASS | A bypass is a road or highway that avoids or "bypasses" a built-up area, town, or village, to let through traffic flow without interference from local traffic, to reduce congestion in the built-up area, and to improve road safety. |
| BUSINESS | A business route (occasionally city route) is a short special route connected to a parent numbered highway at its beginning, then routed through the central business district of a nearby city or town, and finally reconnecting with the same parent numbered highway again at its end. (E.g. Interstate 40 Business) |
| BL | Business Loop (see BUSINESS Route) |
| BR | Business Route (see BUSINESS Route) |
| CITY | see BUSINESS Route |
| CONN | A connector is a highway or freeway road that connects to another highway or freeway. It can be part of an interchange such as the MacArthur Maze or a longer roadway such as the 13 mi (20 km) Interstate 635 (Kansas-Missouri).<br>A connector route is a type of special route or supplemental route that serves as a connector, connecting one route to a more prominent route. Connector routes are found among the United States Numbered Highways and among some state route systems like Michigan and Nebraska. |
| LINK | A link road is a transport infrastructure road that links two conurbations or other major road transport facilities, often added because of increasing road traffic. |
| LOOP | A loop route is a highway or other major road that extends out from a typically longer, more important parents road to enter and (usually) circle a large city. A loop can function as a bypass for through traffic and also to service outlying suburbs. |
| SPUR | A spur route is a short road forming a branch from a longer, more important route (typically a major road, freeway, Interstate Highway or motorway). A bypass or beltway is never considered a true spur route as it typically reconnects with the major road. Both loops and spurs can be forms of special route. |
| TOLL | A toll road (or tollway, turnpike, toll highway or an express toll route) is a privately or publicly built road for which a driver pays a toll (a fee) for use (Example sign: Toll I-376). |
| SCENIC | A scenic route, tourist road, tourist route, theme route, or scenic byway is a specially designated road or waterway that travels through an area of natural or cultural beauty. (E.g. US 40 Scenic or US 412 Scenic) |
| TRUCK | Truck routes exist as alternatives for the mainline routes that are ill-suited for large truck travel with obstacles (such as low clearance bridges, sharp turns, or steep grades) or with conditions which could create dangerous situations to smaller vehicles. An example of such a route is U.S. Route 1/9 Truck in New Jersey. |
| TEMP | Temporary routes complete a gap between two segments of a parent route which exists because the parent route through the area has not been fully constructed yet. |

It should be noted that in addition or alternate to the icons, simple text strings may be used, the text strings for example being the strings in the "value" column of the above table.

Figure 4:
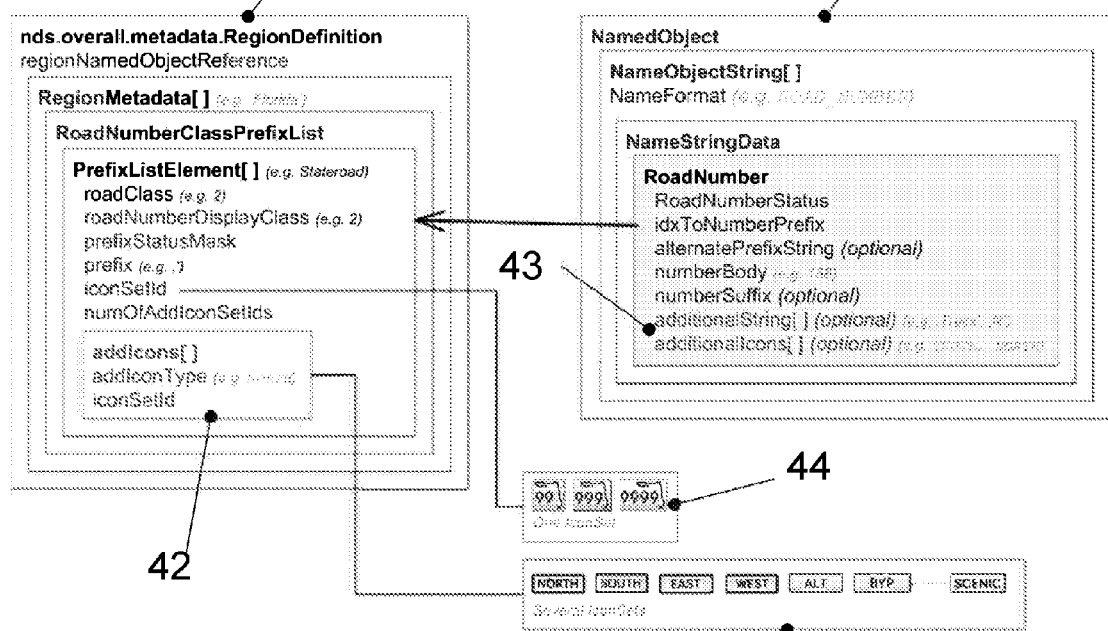
FIG. 4 is a diagram showing example data structures using additional road information icons.

In FIG. 4, corresponding data structures for handling such additional road number icon are shown. In FIG. 4, a metadata structure 40 may be capable of storing suitable icons for a particular region, for example a particular country like US or Canada which may be stored for example in guidance layer 14. 41 designates a data structure for a named object which may for example be stored in name layer 15 of FIG. 2. A link stored in the map database as mentioned above may refer to the named object 41, which is referred to as NamedObject. NamedObject 41 may have one or more NamedObjectStrings which in case of the example of FIG. 4 is of the type ROAD_NUMBER. With this ROAD_NUMBER, data is associated, in particular an index labelled idxToNumberPrefix which relates to an entry in the prefix list of metadata 40, i.e. an entry in the portion of the database storing inter alia the icons. Furthermore, the data stored has an optional alternate prefix string, a number body, and a numberSuffix which is optional. Furthermore, labelled 43 the data has an optional additional-String and/or an optional additionalIcons array where strings relating to additional road information icons and the values of additional road information icons, respectively, may be stored.

The overall metadata structure 40 has a region dependent RegionMetadata[ ] array able to store metadata for different regions, for example different countries, different states in a country (for example Florida), different cities etc. In particular, road number icons and additional road information icons used in the respective region may be stored.

In the region metadata, a roadNumberClassPrefix list is stored which has different list elements which are arrays labelled PrefixListElement[ ] and which contain metadata for different kinds of roads, for example state roads, motorways, European roads etc. The array has a roadClass which may be a number indicating the type of road, i.e. state road, interstate, European road, motorway or the like, a roadNumberDisplay-Class which defines independent from the roadClass an order of importance of the different roadClasses, a prefixStatus-Mask, a default prefix string labelled prefix and an iconSetId which identifies an icon set for road numbers which are as an example shown in box 44.

In addition the PrefixListElements may include an item labeled numOfAddIconSetIds which gives a number of additional iconSets for the respective roadClass. Furthermore, the PrefixListElement may have a new array of additional icons labelled addIcons, each entry in this array may have an icon type labelled addIconType defining the style of the additional icon, i.e. NORTH, SOUTH, BYPASS, or any other of the values in the above table, as well as an iconSetId relating to the icon itself. Each iconSet for each iconType may for example contain the respective icon in different sizes. Icons of such iconSets are shown in a box 45.

In the example shown, the additional string and additional icons 43 may have, for example, truck and N or NORTH, which, on a display of the navigation system, may for example result in a roadNumber icon with two additional icons for example displayed above or below the roadNumber icon, one icon for "TRUCK" and one for "NORTH".

The icons themselves may for example be stored as PNG files. The valueAdIconType may in particular correspond to one or more of the values of the above table.

In other words, the PrefixListElement [ ] may be defined as:

```
PrefixListElement
{
    /**
     * Road number class defines the administrative
classification of the
     * road number. E.g. in Germany European roads will have road
number
     * class 1, highways will have road number class 2.
     */
    RoadNumberClass roadClass;
    /**
     * The road number display class defines the local priority
of the types,
     * e.g. the European roads are of lower local priority in
Germany than
     * highways, while this may be different e.g. in Belgium.
     */
    uint8 roadNumberDisplayClass;
    /** Describes the indicators concerning prefixes. */
    PrefixStatusMask prefixStatusMask;
    /** Prefix */
    Utf8String prefix;
    /**
     * Reference to the icon set which is used for the rendering
of the road
     * number icons in the BMD BB.
     * In some cases, e.g. the road number icons are stored in
the PNG format, a
     * set of icons with different width are needed to support
the road number
     * string rendering with a variable count of characters on
the selected icon
     * dependent on the string length (e.g. A9, A99, B386), but
they are all
     * stored with the same IconSetId.
     */
    IconSetId iconSetId;
    /** number of addition icon set identifiers */
    uint16 numOfAddIconSetIds;
    /**
     * Reference to the icon sets which are used for additional
icons (e.g. used
     * for bannered road numbers) in the BMD BB.
     * In some cases, e.g the road numbers in the U.S. have
additional signs
     * attached to road number like "NORTH", "BYPASS", "TOLL",
etc.
     */
    AdditionalIcon AdditionalIconSetId[numOfAddIconSetIds];
};
``` and the AddIcons[ ] array may be defined as:

```
AdditionalIcon
{
    AdditionalIconType addIconType;
    IconSetId          iconSetId;
};
```

With the above-explained database storing additional road information icons besides road number icons, a navigation system like navigation system 1 of FIG. 1 may display the road number icons together with the additional road information icons on a display screen, which facilitates identifying road signs a driver, or occupant of a vehicle sees with the corresponding road on the display.

The above way of storing and handling of the additional road number icons may be implemented within the frame worth of the NDS (navigation database standard) standard.

However, it is to be noted that the above way of storing the additional roadNumber icons and referring thereto serves only as an example, and other variants are also possible. For example, additional road information icons may be referenced and stored in an additional list to a list containing the road number icons.

Figure 5:
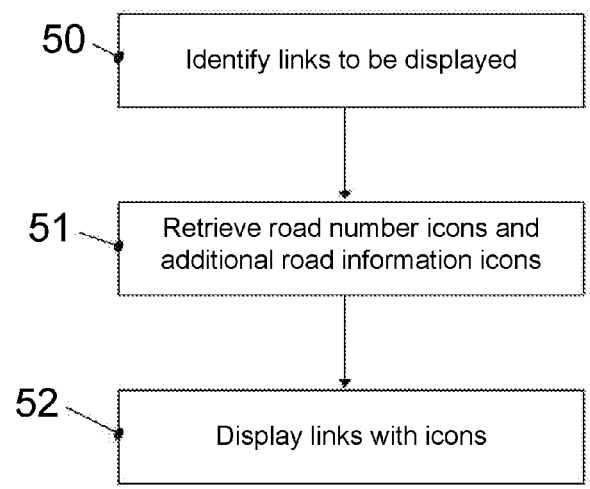
FIG. 5 represents a flow chart illustrating an example method of operation.

In FIG. 5, a method according to another example is illustrated. At 50, links, i.e. road segments, to be displayed are identified based on a map database. At 51, road number icons and, where applicable, additional road information icons of the appropriate size are retrieved from the map database, for example using the data structures explained with reference to FIG. 4. At 52, the links, i.e. road segments, are displayed together with the road number icons and additional road information icons. It should be noted that in some example, the displaying may be in form of a list, while in other embodiments the displaying may be in form of a map.

Figure 6:
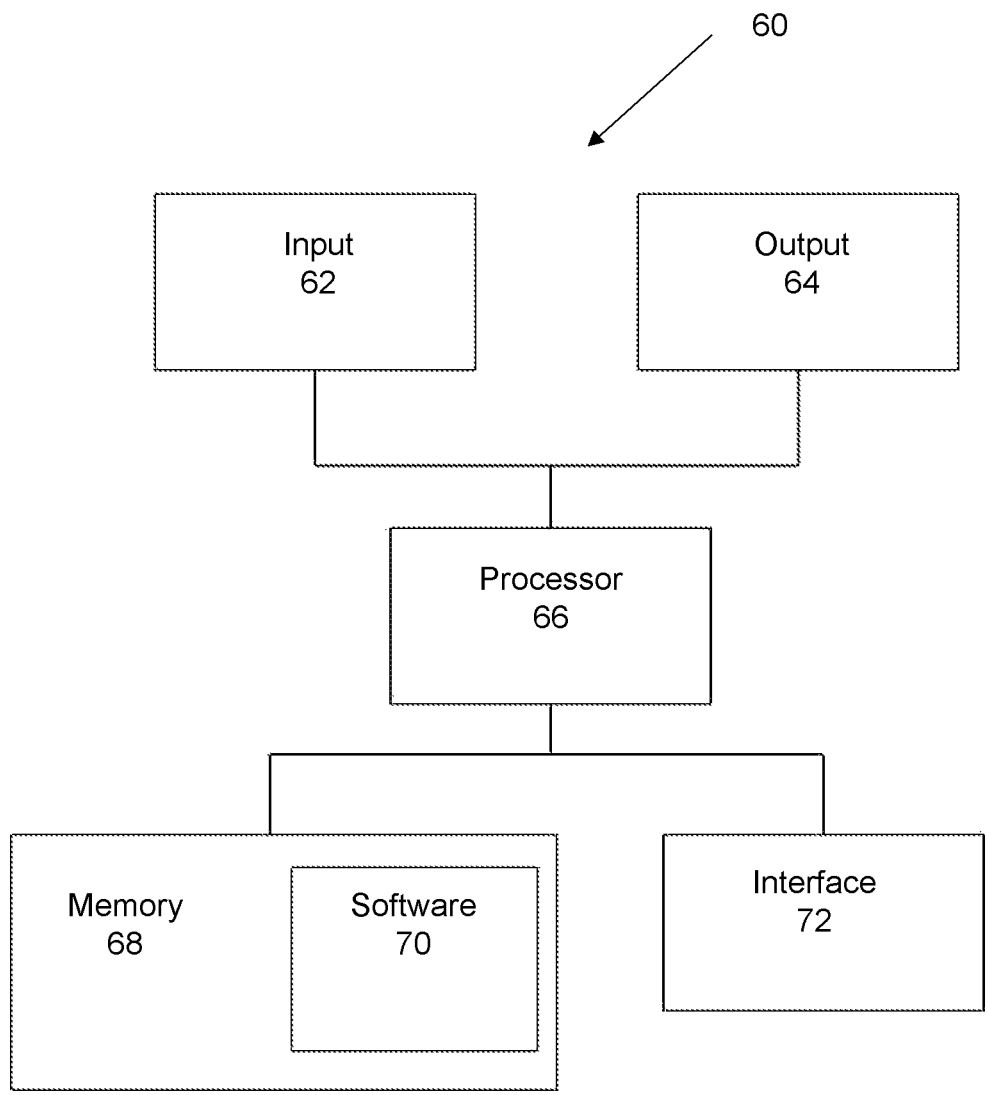
FIG. 6 is an example schematic of a vehicle navigation system.

FIG. 6 is an example of a vehicle navigation system 60. In addition to one or more inputs 62 and one or more outputs 64, the system 60 may include a processor 66, a memory 68, software 70, and an interface 72. The system 60 may include analog signal processing and digital signal processing capability.

The processor 66 may include one or more devices capable of executing instructions to perform one or more operations within the system 60. In FIG. 7, the processor 66 is incorporated into the system 60. The processor 66 may be one or more general processors, digital signal processors ("DSP"), application specific integrated circuits ("ASIC"), field programmable gate arrays ("FPGA"), server computers, networks, digital circuits, analog circuits, combinations thereof, or other now known or later developed devices for analyzing and processing digital and analogue data. The processor 66 may operate in conjunction with a software program, such as instructions or code and data stored in the system 60.

The processor 66 may be coupled with memory 68, or memory 68 may be a separate component. Software 70 may be stored in memory 68. Memory 68 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The memory 68 may include a random access memory for the processor. Alternatively, the memory 68 may be separate from the processor, such as a cache memory of a processor, the system memory, or other memory. The memory may be an external storage device or database for storing recorded data. Examples include a hard drive, compact disc ("CD"), digital video disc ("DVD"), memory card, memory stick, floppy disc, universal serial bus ("USB") memory device, or any other device operative to store data. The memory 68 may be operable to store instructions executable by the processor.

The system 60 may have an interface 72. The interface 72 may include knobs, switches, sliding components, buttons, a mouse, keyboard, a display, a touch screen or other devices or mechanisms capable of receiving user inputs for adjusting, modifying or controlling one or more features of the system 60 and providing outputs sensed by a user. The interface 72 may be used to manipulate one or more characteristics, components, or features of the system 60. For example, the system 60 may include a slider which, when moved, modifies the volume for one or more of the received signals processed by the console. In another example, the interface 72 may include a knob, that when turned, modifies the gain applied by one or more amplifiers in the system 60. In still another example, the interface 60 may be a data input location displayed in a display and a corresponding data input device in which parameters, such as a gain, a threshold, or any other parameter may be entered by a user of the system 60.

The functions, acts, tasks, and/or components described herein may be performed or represented by a programmed processor executing instructions stored in memory. The functions, acts or tasks may be independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like. A processor may be configured to execute the software.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A navigation system comprising:
   a map database having map data, the map data further comprising:
   links representing road segments,
   road number icons, and
   additional road information icons,
   where at least one of the links is associated with at least one of the road number icons and at least one of the additional road information icons,
   a processing unit in communication with the map database and configured to control outputting of route guidance information via an outputting device, the outputting of route guidance information comprising displaying a road number icon and an additional road information icon together with the link, if the link is associated with the road number icon and the additional road information icon,
   where the map database includes a metadata structure comprising road number icons and additional road information icons, and
   where the metadata structure comprises sub-data structures for different regions.

2. The navigation system of claim 1, where the additional road information icons identify different roads having the same road number.

3. The navigation system of claim 1, where the additional road information icons are selected from the group consisting of icons indicating a direction, an icon indicating an alternate route, an icon indicating a bypass, an icon indicating a business route, an icon indicating a city route, an icon indicating a connector route, an icon indicating a link road, an icon indicating a loop, an icon indicating a spur route, an icon indicating a toll route, an icon indicating a scenic route, an icon indicating a route suitable for trucks, and an icon indicating a temporary route.

4. The navigation system of claim 1, where the map database comprises a data structure, the data structure comprising a data entry for each link being associated with a road number, the data entry comprising a reference to the road number and to an additional information icon.

5. The navigation system of claim 1, where the metadata structure comprises metadata entries for different types of roads, each metadata entry comprising road number icons and additional road information icons for the respective type of road.

6. The navigation system of claim 1, where the additional road information icons identify different roads having the same road number.

7. The navigation system of claim 1, where the additional road information icons are selected from the group consisting of icons indicating a direction, an icon indicating an alternate route, an icon indicating a bypass, an icon indicating a business route, an icon indicating a city route, an icon indicating a connector route, an icon indicating a link road, an icon indicating a loop, an icon indicating a spur route, an icon indicating a toll route, an icon indicating a scenic route, an icon indicating a route suitable for trucks, and an icon indicating a temporary route.

8. A method, comprising:
   identifying links by a processing unit to be displayed on a display of a navigation system, retrieving road number icons and additional road information icons associated with at least some of the links from a map database, displaying the links on the display of the navigation system with the retrieved road number icons and the additional road information icons, where the map database includes a metadata structure comprising road number icons and additional road information icons, and where the metadata structure comprises sub-data structures for different regions.

9. The method of claim 8, wherein said additional road information icons identify different roads having the same road number.

10. The method of claim 8, further comprising selecting the second additional road information icons from the group consisting of icons indicating a direction, an icon indicating an alternate route, an icon indicating a bypass, an icon indicating a business route, an icon indicating a city route, an icon indicating a connector route, an icon indicating a link road, an icon indicating a loop, an icon indicating a spur route, an icon indicating a toll route, an icon indicating a scenic route, an icon indicating a route suitable for trucks, and an icon indicating a temporary route.

11. The method of claim 8, where the map database comprises a data structure, the data structure comprising a data entry for each link being associated with a road number, the data entry comprising a reference to a road number and to an additional information icon.

12. The method of claim 8, where the metadata structure comprises metadata entries for different types of roads, each metadata entry comprising road number icons and additional road information icons for the respective type of road.

13. The method of claim 8, wherein said additional road information icons identify different roads having the same road number.

14. The method of claim 8, further comprising selecting the second additional road information icons from the group consisting of icons indicating a direction, an icon indicating an alternate route, an icon indicating a bypass, an icon indicating a business route, an icon indicating a city route, an icon indicating a connector route, an icon indicating a link road, an icon indicating a loop, an icon indicating a spur route, an icon indicating a toll route, an icon indicating a scenic route, an icon indicating a route suitable for trucks, and an icon indicating a temporary route.

15. The navigation system of claim 1, wherein said road number icons comprise an identifier which identifies an icon set for road numbers, and wherein said additional road information icons comprise a type identifier defining a style of an additional icon and a set identifier which identifies a set comprising the additional icon.

16. The method of claim 8, wherein said road number icons comprise an identifier which identifies an icon set for road numbers, and wherein said additional road information icons comprise a type identifier defining a style of an additional icon and a set identifier which identifies a set comprising the additional icon.

* * * * *